INVENTORS
ROBERT E. FEARON
JEAN M. THAYER

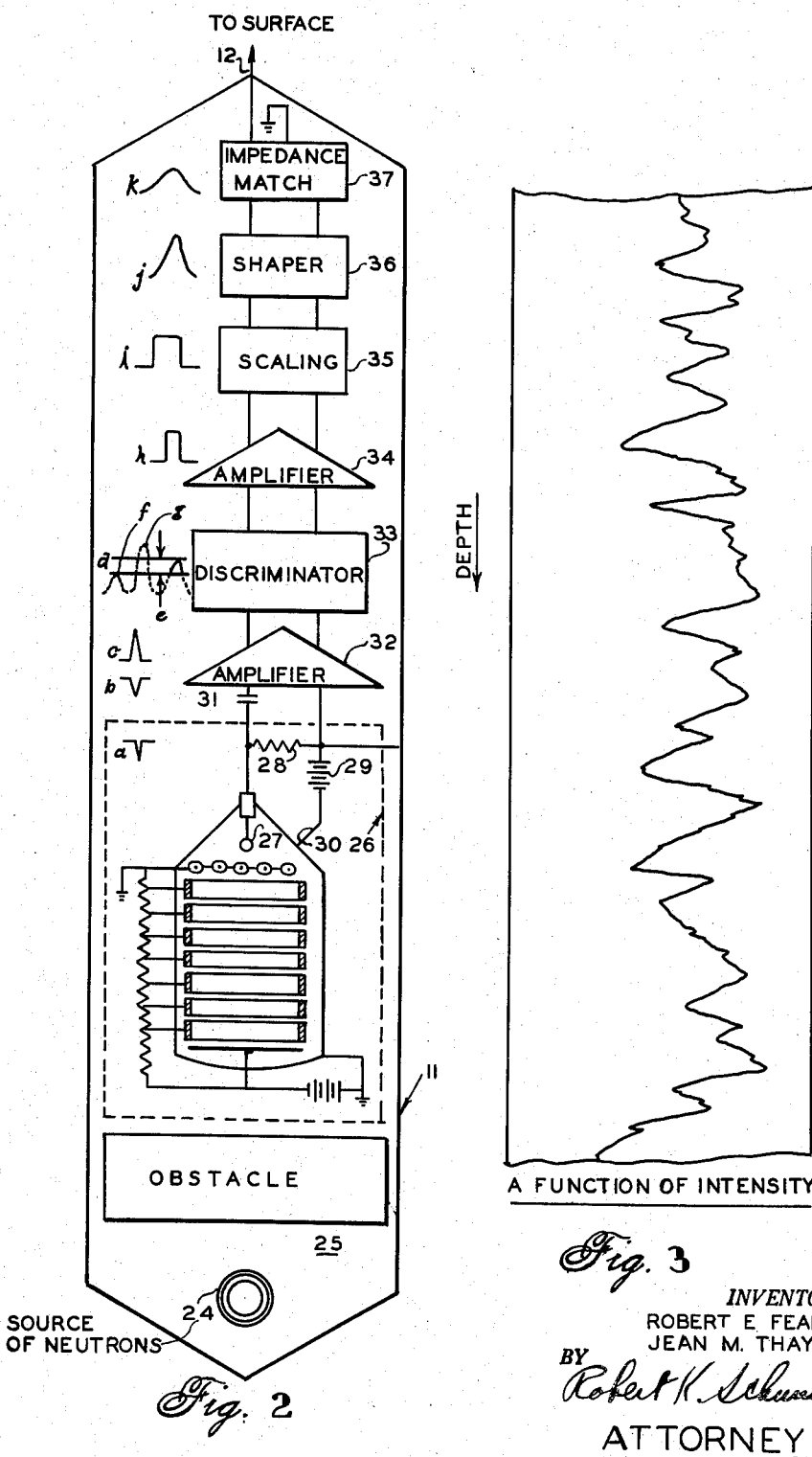

United States Patent Office 2,963,584
Patented Dec. 6, 1960

2,963,584

PULSE HEIGHT ANALYZER

Jean M. Thayer and Robert E. Fearon, Tulsa, Okla., assignors to Well Surveys, Incorporated, a corporation of Delaware Original application July 30, 1949, Ser. No. 107,806, now Patent No. 2,712,081, dated June 28, 1955. Divided and this application June 24, 1955, Ser. No. 517,866

4 Claims. (Cl. 250—83.3)

This application is a division of our copending application Serial No. 107,806, filed July 30, 1949, now U.S. Patent 2,712,081, issued June 28, 1955 for Method for Neutron Well Logging.

This invention relates generally to a method and apparatus for identifying substances existing in difficultly accessible locations, for example, adjacent to a deep narrow drill hole, and more particularly to a method and apparatus for identifying and distinguishing these substances from each other by nuclear reactions in the substances.

This invention is directed to the solution of a problem which has been long recognized by geologists and geophysicists, and by others, confronted with the problem of locating valuable substances, such as petroleum, in the sub-surface formations of the earth. The problem of discovering with certainty the existence of a particularly valuable substance in the sub-surface formations of the earth has only been partially solved by the prior art workers. All prior efforts to solve the problem have met with failure for the reason that no parameter could be found which was solely characteristic of the valuable substances that it was desired to locate. As an example, in the art of well logging a partial solution to the problem goes as far as determining with certainty that either salt water or petroleum exists in a particular formation but a complete solution is not possible, since prior to this invention, no parameter was known whereby the two substances could be distinguished, in situ, from each other.

Numerous other methods advanced by the workers in the prior art for locating valuable substances in the sub-surface formations of the earth include: electrical methods which involve the measurement of self-potential, conductivity, and resistivity; thermal methods; seismic methods which treat of the acoustical properties of the subsurface formations; natural radioactivity of the formations; and those methods in which the formations are irradiated with radioactive radiations and an effect such as the gamma radiation produced by the neutron interactions in the formations measured. All of these methods as well as others which have not been enumerated above, have not afforded a complete solution to the above problem in that none of them measures a parameter that is solely characteristic of the valuable substances that one is desirous of locating.

The instant invention provides a complete solution to the above problem. This solution consists of a system of observations by which the operator is enabled to recognize and quantitatively measure nuclear species of the sub-surface formations adjacent a bore hole. Although the desired substances quite often are not elements or single nuclear species the chemical laws of combining proportions enable accurate appraisal of such things as the occurrence of petroleum. Recognition of nuclear species is accomplished by subjecting the substance adjacent to the bore hole to bombardment with penetrating radiations of a nature to cause specific and determinative quantized changes in the potential energy of the said nuclear species. These quantized energy changes which are specific to the particular kinds of atoms to be determined are used as a means of recognizing the desired atoms, which recognition is accomplished by means of selective neutron detection, selective for specific energy ranges of neutrons, and/or specific limits of direction of incidence and sense of direction of incidence.

Therefore the primary object of this invention is the provision of a method and apparatus for identifying valuable substances by separately measuring the influence of specific properties of the nuclei of the valuable substances upon a flux of fast neutrons.

Another important object of this invention is the provision of a method and apparatus whereby petroleum can be positively identified in the sub-surface strata adjacent a bore hole.

This invention also contemplates a method and means for locating valuable substances situated in difficultly accessible locations by identifying and measuring the influence of at least one of its elementary components on a flux of fast neutrons.

Still another object of this invention is to achieve the above objects by irradiating formations with fast neutrons and measuring the intensity of neutrons falling within specific energy bands and which have rebounded from the formations.

Another object of this invention is to provide a method and means for producing a log of a drill hole by recording versus depth the average rate of occurrence of processes occasioned by fast neutrons of selected energies which enter the detecting device.

A further object of this invention resides in the provision of a method and means for detecting neutrons, selecting pulses produced thereby whose energies lies in a predetermined range, and recording their time-rate of occurrence versus depth.

Other objects and advantages of the present invention will become apparent from the following detailed description when considered with the drawings, in which:

Figure 2 is a diagrammatic illustration of a sub-surface instrument with the detector illustrated in vertical section;

Figure 3 illustrates the type of well log that would be produced by the present invention.

Figures 1, 4:
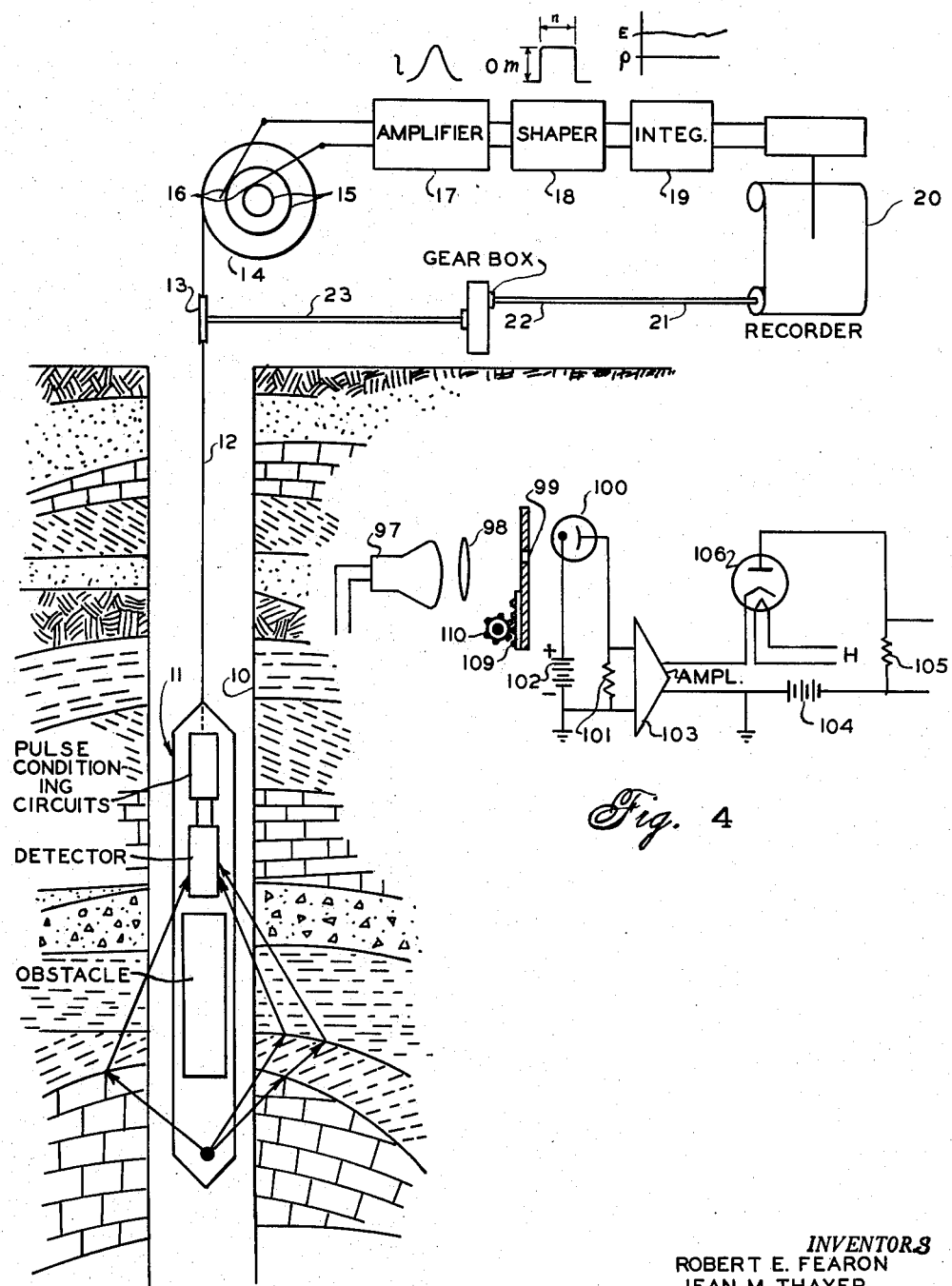
Figure 1 is a schematic illustration of a well logging operation showing the surface recording system.
Figure 4 illustrates schematically a system for classifying the energy of ionizing processes occurring in a fast neutron detector.

Referring to these figures there is illustrated an application of this invention to a well surveying system. In Figure 1 there is shown schematically a drill hole 10 which may or may not be cased. Disposed in the drill hole and adapted to be raised or lowered therein is a housing 11 supported by a cable 12. Cable 12 comprises at least one electrical conductor connecting the electrical apparatus within the housing 11 to apparatus located adjacent the mouth of the drill hole 10. The apparatus on the surface of the earth consists of a measuring wheel 13 over which the cable 12 passes and a winch or drum 14 on which the cable is wound, or from which it is unwound, when the housing 11 is raised or lowered in the drill ho'e 10. Conductors are connected to the cable 12 by means of slip rings 15 and brushes 16 carried on one end of drum 14. These conductors lead to an amplifier 17. Amplifier 17 is a conventional audio amplifier having a flat frequency response. The output of amplifier 17 is conducted to a pulse shaper 18, the purpose of which is to insure the delivery of square topped waves of constant height to an integrator 19. Integrator 19 is adapted to receive the aforementioned pulses and generate therefrom an electromotive force which is proportional to the average time-rate of occurrence of the pulses. This signal is delivered to the recorder 20 where it is recorded versus depth. The depth axis of the recorder is actuated by the shaft 21 which leads from a gear box 22, connecting through shaft 23 to the measuring wheel 13. The gear box 22 has adjustments to enable suitable choice of depth scales.

Referring specifically to Figure 2 a description of the contents of housing 11 will follow. It is to be understood that housing 11 will be constructed to withstand the pressures, and mechanical and thermal abuses encountered in surveying a deep bore hole and yet provide adequate space within it to house the necessary apparatus and permit the transmission of radiation through it.

In the bottom portion of housing 11 there is located a radiation source 24 which may be surrounded by a radiation filtering material 25. This radiation source may take various forms which will be described in detail later in the specification. Above the filtering material 25 and lying between the source of radiation and a radiation detector 26, there is a region of space which may be occupied by suitable materials of left vacant determined by considerations explained as the description progresses.

The detector 26 is of the type which will detect neutrons as a result of the production of prominent bursts of ionization therein, caused by rapid movements of heavy charged particles such as protons, alpha particles, etc., set in motion by the neutrons. The bursts of ionization are very quickly collected in the detector 26. These bursts are registered as electrical pulses and resolved timewise from other or smaller pulses which may occur almost concurrently. The detector 26 is so designed and so operated that the magnitude of the electrical pulse released from the collection of a specified amount of electrical charge will always be quite accurately proportional to the amount of the electrical charge collected and substantially independent of the path in the detector along which the burst of ionization occurred.

The current corresponding to a pulse, flowing in the electrode circuit which includes conductor 27, resistance 28, battery 29 and conductor 30, produces a voltage pulse across the resistance that is of the form illustrated at $a$. The pulse produced across the resistance 28 is impressed through the condenser 31 upon the input of an amplifier 32. As shown at $b$ the pulse has suffered negligible loss and no distortion in passing through the condenser 31. The amplified pulse, illustrated at $c$, has been inverted in polarity but otherwise faithfully reproduced. It is then conducted to the pulse height distribution analyzer 33. Here only those pulses whose magnitude fall within a prescribed range, such as illustrated at $d$ and designated by $e$, are accepted and transmitted. Other pulses such as are illustrated at $f$ and $g$ are not accepted and transmitted. Those pulses which are accepted and transmitted are delivered to an amplifier 34. Amplifier 34 is one having a flat frequency response extending upward to the highest frequency required to faithfully amplify the pulse delivered to it in a manner shown at $h$. The output signal from the amplifier 34 is fed into a scaling circuit 35 which, in a known manner, delivers pulses as illustrated at $i$, the number of which, occurring in a given time is less by a constant factor than the number received in the same interval of time. The output of the scaling circuit is fed into a shaper 36 which transforms the pulse into the shape illustrated at $j$. The shaper 36 may take the form of a powdered iron core transformer. The signal from the transformer is then fed into impedance matching means 37, such as a cathode follower, which faithfully reproduces the voltage wave as illustrated at $k$. The impedance matching means 37 introduces the signal into the transmission line contained within the cable 12 for the purpose of transmitting it to the surface.

It is to be understood that all elements within the housing 11 which require power may be powered in a conventional manner as taught in the art by means such as batteries or rectified alternating current. Batteries which very satisfactorily fulfill the temperature requirements in hot wells are the zinc, potassium hydroxide, mercuric oxide cells.

Again referring to Figure 1, the signals transmitted to the surface by means of cable 12 are taken therefrom by means of slip rings 15 and brushes 16 and are conducted to the amplifier as pulses, one of which is illustrated at $l$. These amplified pulses are received by a pulse shaper 18 which modifies their form in the manner illustrated at $o$. The pulse illustrated at $o$ will always have a fixed square form and a fixed width $n$. These substantially square pulses are then fed into the integrating circuit which delivers the signal to the recorder 20, as has been previously described. The integrating circuit thus produces a time-dependent voltage wave such as shown at $p$. When this signal is impressed on the recorder, which has been coordinated with depth, a curve will be drawn as shown in Figure 3. This curve has as its ordinate depth in the bore hole and as its abscissa a function of an intensity of received radiation, or of a plurality, or combination of intensities. These intensities may be combined by adding, subtracting, or dividing in any desired manner, or may be otherwise mathematically combined. The manner of combination is suitable to specifically indicate or be especially sensitive to, the presence of a particular substance in the region adjacent the bore hole.

Although no power supply has been shown in connection with the surface apparatus, it is to be understood that it will be powered in a conventional manner such as was pointed out in connection with the sub-surface apparatus.

As can be understood from previous parts of this application, it is an object of this invention to measure only certain parts of an otherwise less informative flux of scattered, diffused, or partially absorbed flux of neutrons, and to use data concerning the intensity of these dissected portions of the neutron flux as a means of obtaining more specific information regarding the nature of the substance by which the primary neutron flux is diffused, scattered or absorbed. Quite naturally, therefore, it may be seen that the measurement proposed herein is more difficult in certain particulars than those called for by the discoveries of the prior art. For example, the requirement that there be, within the interval of time in which a measurement is performed, a statistically sufficient number of processes to produce an accurate observation of the average rate of occurrence of such processes, will be less satisfactorily met. This conclusion is derived from the proposition that this discovery concerns itself in each instance with a measurement of only a part of the neutron radiation. Probable error in the measurement of any radiation is decreased when adequate intensity prevails, the percentage probable error in general being inversely proportional to the square root of the intensity. For illustration, therefore, if there are neutrons composing an energy spectrum uniformly distributed from zero to five million electron volts, and it is desired to observe that portion of the energy spectrum lying between three thousand four hundred electron kilovolts, and three thousand five hundred electron kilovolts, the percentage probable error of such a measurement will be approximately seven times worse than it would be if the measurement had used all the neutrons. It follows, therefore, that strong fluxes of neutrons are needed to practice this well logging method. It likewise follows that, if the neutrons are to be undirected, there is need that they be generated in some isotropic nuclear process.

The strength of neutron source required will be related to the economic requirement of logging speed, and the error which is considered tolerable in a given case, by the formula $$\rho = 1.5 \times 10^{-6} \frac{S}{\delta}$$

where

S is logging speed in feet per hour
$\delta$ is the fraction of the total flux of fast neutrons incident on the detector from all directions
$\rho$ is the intensity of primary neutrons, in units of $10^7$ per second at 8 million electron volts from the source.

Error of +5% has been assumed (for spacings, source to detector in the range 10″–18″).

If the undirected flux of neutrons is monoenergetic, the chosen isotropic nuclear process must of necessity be one in which a constant amount of energy is liberated into the propulsion of the neutron every time the said process occurs. It also follows that if the primary neutron flux is to be of a penetrating nature, the neutrons generated therein must be of relatively high energy. If helium is to be considered as a recoiling substance in a detector of neutron radiation, neutrons cannot be employed which have energies high enough to undergo an inelastic collision with helium. If high energy neutrons are employed, a more complex and ambiguous distribution of recoil energies will occur. To illustrate the ambiguity brought about in such a case, consider, for example, the problem of determining the presence of fast neutrons having a kinetic energy of one million electron volts. If the incident flux of fast neutrons which impinges upon helium contains also some neutrons having energy of 21 million electron volts, absorption of the resonance energy of 20 million electron volts will occur to these, sometimes generating 1 million electron volt neutrons, a fraction of which will be measured, and will be indicated in a manner indistinguishable from the effect caused by the neutrons which had one million electron volts in the first place. This result is altogether avoided if no neutrons having energies equal to, or greater than, 20 million electron volts are emitted from the source.

The requirement that very many neutrons be available is met only if there be sufficient energy dissipated per unit of time by whatever bombardment produces the neutrons. There are two ways of producing an adequate flux of neutrons within the space available for a well logging radiation source. One of these ways is to provide a mixture of beryllium with an alpha-ray emitter of a sufficient degree of activity per unit volume. This achievement is favored if such an alpha-ray emitter (a) Has a short half life. This increases the rate of energy liberation per unit weight and per unit volume, other things being equal.

(b) Is a parent of a series which gets into equilibrium sufficiently quickly, and which comprises sufficiently numerous alpha-emitting daughter products in the series.

(c) Has large energy per alpha particle.

(d) Has a low atomic weight.

Of the above 4 conditions, only the first 3 are at all possible since there are fundamentally serious theoretical difficulties which appear to absolutely prohibit the fulfillment of any expectations of consequence with respect to item d. It may be said further that, with only one exception, which is not of any importance to the uses of this invention, the expectation of the present theory is fully confirmed with respect to the above stated conclusion pertaining to item d. Of the thousand or so isotopes that are now known, only one having atomic number less than 81, or an atomic weight less than 208, samarium, is found to emit alpha particles. Furthermore, this one exception emits alpha particles of such a low energy, and emits so few of them per unit weight of material per unit time, that it would be utterly useless to consider it as a practical source of bombardment to generate neutrons from beryllium. It is, therefore, perfectly clear that the considerations of the first three items are those which prevail in attempting to arrange a bountiful source of neutrons made of a mixture of beryllium with alpha-ray emitting substance. The particular merits of an arrangement containing an adequate quantity of actinium, or actinium salt, mixed with beryllium have been taken note of in United States Patent No. 2,515,502 and will not be reviewed extensively here, except to note the fact that one can, with actinium, crowd 200 times as much neutron-emitting power into a given space as can be done with radium-beryllium mixtures. Polonium would be a suitable substance for a concentrated source of neutrons. Thorium X would be suitable, and would enable the design of very powerful neutron sources with limited available space. Numerous other effective choices of powerful neutron sources are possible, and will be apparent to those familiar with the art, upon consideration of the previously outlined conditions for the design of such powerful neutron-emitting sources.

Returning to the general question of powerful and intense sources of neutrons in a broader sense, it is apparent that in the limited space within a well one is at liberty to consider electrically or electro-magnetically accelerated ion beams impinging upon suitable target material provided they do not require particle energy in the beam that is too high to be conveniently producible (considering insulation problems, etc.) within the limited space available. It is clear therefore, that reactions between ionic beam materials and suitable target substances are a matter of consequence to the practice of this invention with increasing emphasis in the case of those target reactions having a low threshold of energy per bombarding ionic particle for their onset.

As is well known in the art of designing R.F. power supplies such as those used for television sets, it is feasible to produce electrical potential differences of the order of 20 thousand volts within a limited space, and insulated by very reasonable thicknesses of rubber or other high voltage insulation.

There are available for consideration two nuclear reactions which can be excited by ionic beams propelled by no greater electrical potential difference than 20 thousand volts. These reactions are:

(a) The bombardment of deuterium atoms by deuterium ions, or if preferred, bombardment of substances rich in deuterium atoms with moving deuterium ions.

(b) Bombardment of tritium atoms or molecules rich in tritium atoms with deuterium ions, or conversely, the equivalent process, bombardment of deuterium atoms, or substances rich in deuterium atoms by moving tritium ions.

This latter reaction is one especially favored for the practice of this invention, because of its large efficiency, and because of the extremely favorable way in which the efficiency of this reaction improves with electrical potential applied at very low electrical potential differences. The second of these reactions is also particularly favored because of the large self-energy, that is, conversion of mass into kinetic energy, by which it is characterized, amounting to approximately 17 million electron volts, of which approximately 14 million are delivered to the neutron which is produced. Owing to the very large self-energy to which reference has been made above, neutrons derived from this preferred target reaction at very low bombarding energies nevertheless have very great energy, and are substantially monoenergetic. The same things can be said, but to a lesser degree, in respect to the first named of the two described bombardments. In it, the self-energy is less, delivering only 2.5 million electron volts to the neutrons, and the efficiency of the reaction is much lower. Accordingly, smaller fluxes of neutrons would be available under like circumstances, and the neutrons would be less monoenergetic.

The pulse height distribution analyzer 33 may take the form illustrated in Figure 4. The output of amplifier 32 is impressed upon the deflecting plates of one or more cathode ray tubes 97. Directly in front of each of the screens of the cathode ray tubes is an optical system 98 which delivers an image to an energy gate or selector slit 99. It is to be understood that each cathode ray tube is provided with such an optical system and all of the elements that will be described in connection with one cathode ray tube. There is provided a photoelectric cell 100 which is disposed directly in back of the selector slit 99. A resistance 101 and a battery 102 are connected in series with the photoelectric cell 100. Connected across resistance 101 is an amplifier 103 which has its output connected in a circuit that comprises a battery 104, a resistance 105, and a diode rectifier tube 106. Connected across resistance 105 is the amplifier 34.

Selector slit 99 may be provided with a gear rack 109 in which a pinion gear 110 may be operated to change the position of the slit or energy gate 99.

Pulses are produced in the circuit connected to the electrode 27 in the manner which has been previously described, by collection of electrons by the electrode 27. These pulses, after being amplified are delivered to a pair of deflection electrodes in a cathode ray tube. The time course of a pulse on a cathode ray tube may be thought of as a more or less smooth rise and fall of a fluorescent spot caused by a stream of electrons striking the screen. This more or less smooth rise and fall, for the sake of illustration, may be likened to the positive leg of one cycle of a sinusoidal wave. For a better understanding of this, attention is directed to pulses of the above described nature which consist of excursions of equal height on the cathode ray tube, and which are supposed to occur only in one direction, there being no long transient. It can readily be seen that the brightness of the streak of light, caused by the repeated occurrence of such pulses, will have a high maximum in the part of the pulse where the cathode ray beam may be regarded as stopping and turning around to return to the baseline in preparation for another pulse. If now the slit of the selector 99 is so arranged that this region of great brightness shows upon the slit, much larger electrical pulses will occur in the circuit connected to the photocell 100 than would occur if the image of the streak of light fell upon the slit in such a manner that a portion of smaller brightness entered in the region of the slit. Accordingly, therefore, the gain of amplifier 103 is chosen, and the magnitude of the voltage delivered by the battery 104 is taken, just sufficient that a pulse corresponding with the maximum brightness portion of the cathode ray streak causes a signal to be delivered into the amplifier 34 over the opposition of the battery 104. The signals delivered into amplifier 34 will not exist for slit positions on pulse heights corresponding with parts of the streak of a lower brightness, out of the pulse image on the selector 99.

The discussion which has just preceded sets forth the the reasons why pulses of any height, other than those having their peaks falling upon the slit 99, will not be seen in the system coupled to amplifier 34. Pulses of lower height will not be seen because no portion of the transit of the fluorescent spot caused by the electron stream falls upon the slit of selector 99. There will, therefore, be pulses delivered to amplifier 34 which coincide in time with those events occurring in the circuit coupled electrode 27, and only to those events which fall in a specified pulse height range. The pulses amplified by amplifier 34 are acted upon by succeeding elements and ultimately measured or recorded upon recorder 20 as an indication of the rate of production of pulses of a particular range of sizes indicative of specific characteristics of the formations.

It is to be understood that this invention is not to be limited to the specific modifications described, but is to be limited only by the following claims.

We claim:

1. Apparatus for analyzing the energies of electrical pulses comprising a cathode ray tube having electron beam producing means, beam deflecting means, and beam target means; means for applying the pulses to be analyzed to said deflecting means; and means for selectively measuring substantially only those beam deflections reaching maxima within at least one selected portion of said target means.

2. In a radioactivity well logging system, an analyzer of energies of radiations comprising a pulse-type detector of radiations that produces electrical pulses of energies systematically related to the energies of respective radiations; a cathode ray tube having electron beam producing means, beam deflecting means, and a fluorescent screen; means for applying said pulses to said deflecting means; and means for measuring selectively substantially only those beam deflections reaching maxima within at least one selected portion of said screen, said measuring means including a photoelectric cell.

3. In a radioactivity well logging system, apparatus for analyzing the energies of electrical pulses comprising a cathode ray tube having electron beam producing means, beam deflecting means, and a fluorescent screen; means for applying the pulses to be analyzed to said deflecting means; a photoelectric cell exposed to a selected portion of said screen for producing electrical pulses systematically related to the light incident thereon; rectifying means; means for applying said produced electrical pulses to said rectifying means; means for biasing said rectifying means to pass only large pulses indicative of the stopping of the electron beam on said selected portion of said screen; and means for measuring said passed pulses as indicative of initial electrical pulses of selected energies.

4. Apparatus for analyzing the energies of electrical pulses comprising a cathode ray tube having electron beam producing means, beam deflecting means, and a fluorescent screen about which the electron beam is deflected by said beam deflecting means; means for applying the pulses to be analyzed to said beam deflecting means; and photosensitive means for selectively measuring substantially only those beam deflections reaching maxima within a selected portion of said screen.

References Cited in the file of this patent

UNITED STATES PATENTS

| | | |
|---|---|---|
| 2,455,532 | Sunstein | Dec. 7, 1948 |
| 2,469,460 | Fearon | May 10, 1949 |
| 2,474,380 | Simmon | June 28, 1949 |
| 2,557,691 | Rieber | June 19, 1951 |
| 2,617,042 | Wouters | Nov. 4, 1952 |
| 2,654,027 | Baum | Sept. 29, 1953 |